US010521745B2

(12) United States Patent
Burke et al.

(10) Patent No.: US 10,521,745 B2
(45) Date of Patent: Dec. 31, 2019

(54) VIDEO REVIEW WORKFLOW PROCESS

(71) Applicant: Adobe Inc., San Jose, CA (US)

(72) Inventors: Todd Burke, Mountain View, CA (US);
Stacy Young, Kanata (CA); Jim Leask, Stittsville (CA)

(73) Assignee: Adobe Inc., San Jose, CA (US)

( * ) Notice: Subject to any disclaimer, the term of this patent is extended or adjusted under 35 U.S.C. 154(b) by 950 days.

(21) Appl. No.: 15/063,649

(22) Filed: Mar. 8, 2016

(65) Prior Publication Data

US 2016/0189086 A1 Jun. 30, 2016

Related U.S. Application Data

(62) Division of application No. 12/361,343, filed on Jan. 28, 2009.

(51) Int. Cl.
*G06Q 10/06* (2012.01)
*G06Q 10/10* (2012.01)
*G11B 27/036* (2006.01)
*H04N 21/43* (2011.01)
*H04N 21/472* (2011.01)
*H04N 21/488* (2011.01)

(52) U.S. Cl.
CPC ... *G06Q 10/063116* (2013.01); *G06Q 10/101* (2013.01); *G06Q 10/103* (2013.01); *G06Q 10/1097* (2013.01); *G11B 27/036* (2013.01); *H04N 21/4307* (2013.01); *H04N 21/47205* (2013.01); *H04N 21/4888* (2013.01)

(58) Field of Classification Search
CPC ......... G06Q 10/063116; G06Q 10/103; G06Q 10/1097; G06Q 10/101
See application file for complete search history.

(56) References Cited

U.S. PATENT DOCUMENTS

| 5,040,142 | A | 8/1991 | Mori et al. |
| 5,706,452 | A | 1/1998 | Ivanov |
| 5,890,177 | A | 3/1999 | Moody et al. |
| 5,892,900 | A | 4/1999 | Ginter et al. |
| 5,995,940 | A | 11/1999 | Ramaley |
| 6,088,709 | A | 7/2000 | Watanabe |
| 6,243,722 | B1 | 6/2001 | Day et al. |
| 6,687,878 | B1 | 2/2004 | Eintracht et al. |
| 6,743,094 | B2 | 6/2004 | Johnson |
| 6,789,109 | B2 | 9/2004 | Samra et al. |
| 6,898,601 | B2 | 5/2005 | Amado et al. |
| 7,072,575 | B2 * | 7/2006 | Kang ............... H04N 5/04 386/201 |
| 7,343,552 | B2 | 3/2008 | Denoue |
| 7,360,164 | B2 | 4/2008 | Bjoemsen et al. |
| 7,366,979 | B2 | 4/2008 | Spielberg et al. |
| 7,389,241 | B1 | 6/2008 | Bascom |
| 7,418,661 | B2 | 8/2008 | Brandenberger |
| 7,555,557 | B2 | 6/2009 | Bradley et al. |

(Continued)

OTHER PUBLICATIONS

Adobe, "Get comments quickly with clip notes", www.studio.adobe.com, 2006.*

(Continued)

*Primary Examiner* — Steven S Kim
(74) *Attorney, Agent, or Firm* — Finch & Maloney PLLC

(57) ABSTRACT

Subject matter disclosed herein relates to video content editing, and in particular, to video review workflow.

15 Claims, 6 Drawing Sheets

(56) References Cited

U.S. PATENT DOCUMENTS

| | | | |
|---|---|---|---|
| 7,559,017 B2 | 7/2009 | Datar et al. |
| 7,702,521 B2 | 4/2010 | Bascom |
| 7,739,255 B2 | 6/2010 | Hengel et al. |
| 7,779,347 B2 | 8/2010 | Christiansen et al. |
| 7,783,154 B2 | 8/2010 | Wilkins et al. |
| 7,801,392 B2 | 9/2010 | Koyama et al. |
| 7,818,678 B2 | 10/2010 | Massand |
| 7,822,760 B2 | 10/2010 | Yeun |
| 7,823,055 B2 | 10/2010 | Sull et al. |
| 7,831,581 B1 | 11/2010 | Emigh et al. |
| 7,840,033 B2 | 11/2010 | Kurzweil et al. |
| 7,840,956 B2 | 11/2010 | Gough et al. |
| 7,934,160 B2 | 4/2011 | Bono et al. |
| 8,046,323 B2 | 10/2011 | Ma et al. |
| 8,055,712 B2 | 11/2011 | Kagawa et al. |
| 8,321,784 B1 | 11/2012 | Ranganathan et al. |
| 8,806,320 B1 | 8/2014 | Abdo |
| 8,930,843 B2 | 1/2015 | Mangini et al. |
| 8,990,214 B2 | 3/2015 | Haot |
| 9,384,178 B2 * | 7/2016 | Nydam .............. G06F 17/24 |
| 9,785,914 B2 * | 10/2017 | Gupta ............... G06Q 10/103 |
| 2001/0030667 A1 | 10/2001 | Kelts |
| 2002/0038374 A1 | 3/2002 | Gupta et al. |
| 2002/0129057 A1 | 9/2002 | Spielberg et al. |
| 2003/0023755 A1 | 1/2003 | Harris et al. |
| 2003/0086695 A1 | 5/2003 | Okamoto et al. |
| 2003/0112273 A1 | 6/2003 | Hadfield et al. |
| 2003/0182177 A1 | 9/2003 | Gallagher et al. |
| 2003/0182206 A1 | 9/2003 | Hendrix et al. |
| 2003/0185448 A1 | 10/2003 | Seeger et al. |
| 2004/0001649 A1 | 1/2004 | Simmons |
| 2004/0070594 A1 | 4/2004 | Burke |
| 2004/0080611 A1 | 4/2004 | Kakii |
| 2004/0085354 A1 | 5/2004 | Massand |
| 2004/0128144 A1 | 7/2004 | Johnson et al. |
| 2004/0168149 A1 | 8/2004 | Nirell |
| 2004/0172450 A1 | 9/2004 | Edelstein et al. |
| 2004/0205542 A1 | 10/2004 | Bargeron et al. |
| 2004/0205545 A1 | 10/2004 | Bargeron et al. |
| 2004/0230894 A1 | 11/2004 | Elza et al. |
| 2004/0237032 A1 | 11/2004 | Miele et al. |
| 2005/0086179 A1 | 4/2005 | Mehmet |
| 2005/0120127 A1 | 6/2005 | Bradley et al. |
| 2005/0155070 A1 | 7/2005 | Slaughter |
| 2005/0185930 A1 | 8/2005 | Jung et al. |
| 2005/0204393 A1 | 9/2005 | Bopardikar et al. |
| 2005/0209989 A1 | 9/2005 | Albornoz et al. |
| 2005/0234958 A1 | 10/2005 | Sipusic |
| 2005/0249374 A1 | 11/2005 | Levy |
| 2005/0289452 A1 | 12/2005 | Kashi et al. |
| 2006/0026502 A1 | 2/2006 | Dutta |
| 2006/0031755 A1 | 2/2006 | Kashi |
| 2006/0069605 A1 | 3/2006 | Hatoun |
| 2006/0080432 A1 | 4/2006 | Spataro et al. |
| 2006/0100991 A1 | 5/2006 | Hartel et al. |
| 2006/0143558 A1 | 6/2006 | Albornoz et al. |
| 2006/0150079 A1 | 7/2006 | Albornoz et al. |
| 2006/0161838 A1 | 7/2006 | Nydam et al. |
| 2006/0173803 A1 | 8/2006 | Morris |
| 2006/0271836 A1 | 11/2006 | Morford et al. |
| 2007/0073776 A1 | 3/2007 | Kalalian et al. |
| 2007/0078948 A1 | 4/2007 | Julia et al. |
| 2007/0118598 A1 | 5/2007 | Bedi et al. |
| 2007/0234194 A1 | 10/2007 | Tsuchiya |
| 2007/0239839 A1 | 10/2007 | Buday |
| 2007/0245243 A1 | 10/2007 | Lanza et al. |
| 2007/0260996 A1 | 11/2007 | Jakobson |
| 2007/0297029 A1 | 12/2007 | Low et al. |
| 2008/0028314 A1 | 1/2008 | Bono et al. |
| 2008/0077866 A1 | 3/2008 | Margulis |
| 2008/0098432 A1 | 4/2008 | Hardacker et al. |
| 2008/0154908 A1 | 6/2008 | Datar |
| 2008/0155615 A1 | 6/2008 | Craner et al. |
| 2008/0177782 A1 | 7/2008 | Poston et al. |
| 2008/0190271 A1 | 8/2008 | Taub |
| 2008/0235597 A1 | 9/2008 | Schlesinger et al. |
| 2009/0006965 A1 | 1/2009 | Bodin |
| 2009/0055483 A1 | 2/2009 | Madan et al. |
| 2009/0076843 A1 | 3/2009 | Graff et al. |
| 2009/0083710 A1 | 3/2009 | Best et al. |
| 2009/0097815 A1 | 4/2009 | Lahr et al. |
| 2009/0111374 A1 | 4/2009 | Lee |
| 2009/0164904 A1 | 6/2009 | Horowitz et al. |
| 2009/0164985 A1 | 6/2009 | Balko et al. |
| 2009/0199083 A1 | 8/2009 | Sar et al. |
| 2009/0235182 A1 | 9/2009 | Kagawa et al. |
| 2009/0249224 A1 | 10/2009 | Davis et al. |
| 2009/0254903 A1 | 10/2009 | Dufosse et al. |
| 2009/0319885 A1 | 12/2009 | Amento et al. |
| 2009/0327856 A1 | 12/2009 | Mouilleseaux |
| 2010/0017754 A1 | 1/2010 | Cafer |
| 2010/0095198 A1 | 4/2010 | Bultrowicz et al. |
| 2010/0095211 A1 * | 4/2010 | Kenvin ............... G11B 27/034 715/723 |
| 2010/0114642 A1 | 5/2010 | Dufosse et al. |
| 2010/0131836 A1 | 5/2010 | Dukhon et al. |
| 2010/0138756 A1 | 6/2010 | Saund et al. |
| 2010/0241691 A1 | 9/2010 | Savitzky |
| 2010/0287473 A1 | 11/2010 | Recesso |
| 2010/0293027 A1 | 11/2010 | Du Fosse |
| 2011/0012929 A1 | 1/2011 | Grosz |
| 2011/0238768 A1 | 9/2011 | Habets et al. |
| 2011/0243447 A1 * | 10/2011 | Meulenbroeks ...... G10L 13/033 382/182 |
| 2012/0081554 A1 | 4/2012 | Berman |
| 2012/0144286 A1 | 6/2012 | Bank et al. |
| 2013/0091240 A1 | 4/2013 | Auger et al. |
| 2013/0132455 A1 | 4/2013 | Mangini et al. |
| 2013/0124978 A1 | 5/2013 | Horns et al. |
| 2013/0132814 A1 | 5/2013 | Mangini et al. |
| 2013/0132886 A1 | 5/2013 | Mangini et al. |

OTHER PUBLICATIONS

Adobe Reader 8 User's Manual, Copyright © 2006 Adobe Systems Incorporated, 142 pages.

Commenting and Markup tools Overview, http://help.adobe.com/en_US/Reader/8.0/help.html?content=WSA13C481B-B0A-41d5-ADDF-3C669541CA35.html, Jul. 2006, 2 pages.

Dummies.com, "Adding and Hiding Comments in Word 2007," downloaded via the Waybackmachine, Dec. 8, 2007-May 15, 2008, 2 pages.

How to Use Microsoft Word's Commenting Features, http://www.cwrf.utexas.edu/node/56, 1998, 6 pages.

http://en.wikipedia.org/wili/Image_map, Image map, last modified on May 22, 2009, printed on May 27, 2009, 2 pages.

Quick Tip: Resize any Textbox or textarea, How-to-geek, Jun. 25, 2007, pp. 1-2.

Steve Johnson, "Microsoft Office Word 2007 on Demand," Feb. 13, 2007, Que, pp. 331-340.

Track Changes & Comments in Microsoft Word, University of North Carolina Writing Center course handout, www.unc.edu/depts/wcweb 1998-2007, 4 pages.

U.S. Appl. No. 12/395,197, Notice of Allowance dated Nov. 13, 2015 (8 pages).

Woohoo, "Photoshop Panels: Integrating your ExtendScripts," Dec. 22, 2008, 4 pages.

Ron White, "How Computers Work", Que, Oct. 2003, 7th Edition.

\* cited by examiner

VIDEO REVIEW WORKFLOW PROCESS

CROSS-REFERENCE TO RELATED APPLICATION

This application is a divisional of U.S. patent application Ser. No. 12/361,343 (filed 28 Jan. 2009), the entire disclosure of which is hereby incorporated by reference herein.

BACKGROUND

Field

Subject matter disclosed herein relates to editing video content, and in particular, to workflows for reviewing such edited content.

Information

A workflow for processing and editing video content may include many details or aspects. Such aspects, for example, typically may include one or more reviewers or editors reviewing at least portions of content in the form of video. Of course, it is understood that video content, here, may include an audio portion as well. A video review process typically includes physically transporting video media among members of a video production/review team, including one or more processors, reviewers, editors, or the like. Upon or after completion of a member's task, the video media or content may be retrieved and sent to a subsequent member. For example, an editor may send video content to a first reviewer, wait for notification that the first review has completed a task, then send the video content to a second reviewer, and so on. Since several members may be involved in processing, reviewing, or editing such video content, a workflow to review edited content may be relatively long or relatively complex. Managing such a workflow may thus be complex and such complexity may make it error-prone.

BRIEF DESCRIPTION OF THE FIGURES

Non-limiting and non-exhaustive embodiments will be described with reference to the following figures, wherein like reference numerals refer to like parts throughout the various figures unless otherwise specified.

DETAILED DESCRIPTION

Figure 1:
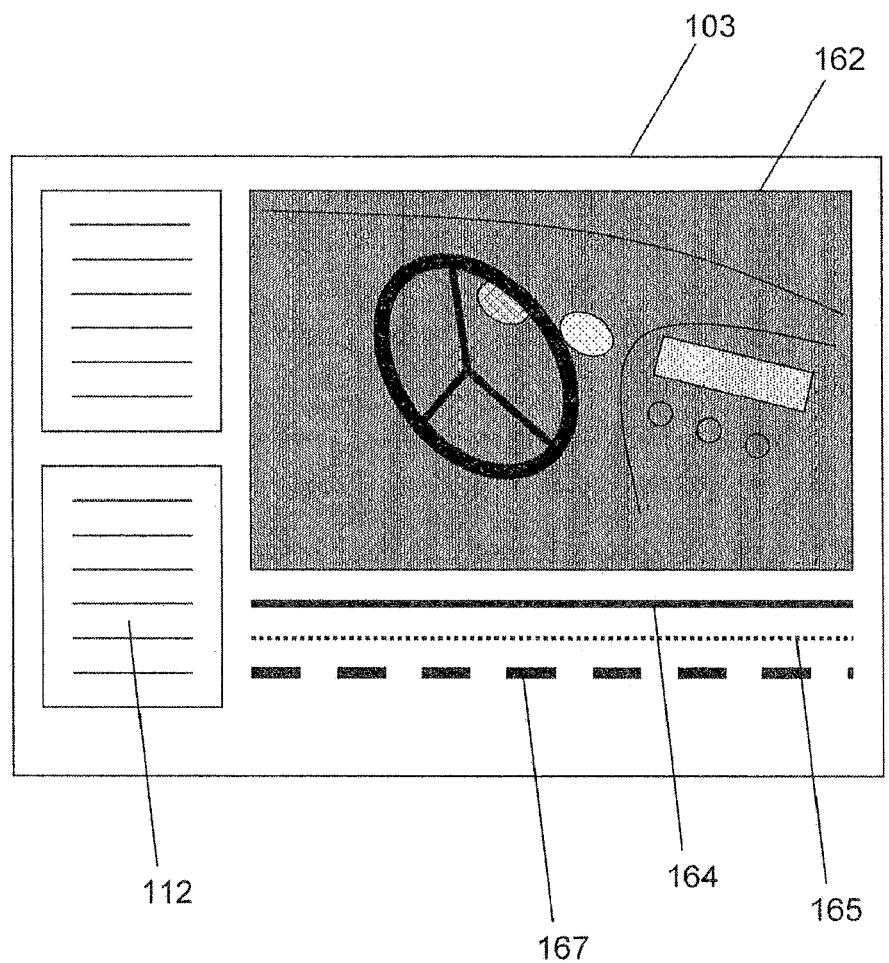
FIGS. 1 and 2 are screenshot views of an editor display and a reviewer display, respectively, according to an embodiment.

In the following detailed description, numerous specific details are set forth to provide a thorough understanding of claimed subject matter. However, it will be understood by those skilled in the art that claimed subject matter may be practiced without these specific details. In other instances, methods, apparatuses, or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

The terms, "and," "and/or," and "or" as used herein may include a variety of meanings that will depend at least in part upon the context in which it is used. Typically, "and/or" as well as "or" if used to associate a list, such as A, B or C, is intended to mean A, B, and C, here used in the inclusive sense, as well as A, B or C, here used in the exclusive sense. Reference throughout this specification to "one embodiment" or "an embodiment" means that a particular feature, structure, or characteristic described in connection with the embodiment is included in at least one embodiment of claimed subject matter. Thus, the appearances of the phrase "in one embodiment" or "an embodiment" in various places throughout this specification are not necessarily all referring to the same embodiment. Furthermore, the particular features, structures, or characteristics may be combined in one or more embodiments. Embodiments described herein may include machines, devices, engines, or apparatuses that operate using digital signals. Such signals may comprise electronic signals, optical signals, electromagnetic signals, or any form of energy that provides information between locations.

In an embodiment, a workflow process to review video content, such as edited video content, may allow one or more editors or reviewers to review video content or to exchange reviewed video content among one another. Such a process may be facilitated by extensible markup language (XML), which may allow editors or reviewers to exchange such content via an electronic network, intranet, or the Internet, for example. A workflow process may include creating a workflow schedule electronically so that manual workflow scheduling need not be involved. Such a workflow schedule may comprise processes having a begin point and an end point of a particular discrete set of tasks to accomplish a particular goal, for example. Individual processes may further comprise one or more tasks or subtasks to be completed by one or more reviewers or one or more editors with respect to one or more video clips, for example. Such a workflow schedule may also be customizable with respect to such tasks, reviewers, or editors, such as the order in which the reviewers or editors perform the tasks. In a particular embodiment, after a workflow schedule is electronically created, reviewers or editors may be electronically messaged regarding tasks with respect to one or more video clips. An embodiment of a video review workflow process may also include electronically supplying one or more video clips to reviewers or editors for completion of tasks in accordance with a workflow schedule. In another particular embodiment, at least some tasks may comprise commenting upon one or more video clips, usually captured in electronic form. Such comments may be time synchronized with the video clips so that one or more subsequent editors or reviewers of a particular video clip may view captured comments along with the particular video clip at appropriately synchronized times intended by one or more particular editors providing the particular comments, as will be explained below in more detail. In this context, a comment may mean a note, other text, or other marks, such as editing marks, which may, for example, be employed to explain, illustrate, criticize, question, expand upon, or in any other way edit one or more portions of a video file, for example.

In an embodiment, a video editor may include a graphical user interface (GUI) capable of playing or editing video. Of course, various embodiments of a video editor and associated GUI are possible and it is not intended to limit claimed subject matter to a particular embodiment. Nonetheless, a variety of possible embodiments are described below without intending to be limiting in any way. Such a video editor may, for example, in one embodiment comprise a special purpose machine capable of executing instructions represented by digital signals. A GUI may include a user interface to play a video segment, where the video segment may further include multiple, selectable video clips, for example. A GUI may also include a user interface to present a chronological representation of multiple, selectable video clips along with a timeline providing timing signals associated with the video segment. A video editor may also include the capability to scale a representation of the timing signals associated with a selected video clip to present a defined time scale in the timeline, for example. Such a component of a video editor may be referred to as a time scale adjuster or a time scaler, for example. In a particular embodiment, a chronological representation may include thumbnail representations of the multiple, selectable video clips. A timeline thus may be employed, for example, to present chronological or durational information about the multiple, selectable video clips on a defined time scale. A video editor may also select a most recently-played video clip for the selected video clip. A GUI may also concurrently present a selected video clip presented in a video segment user interface along side a chronological representation of at least one of the multiple, selectable video clips that is "chronologically adjacent" to the selected video clip. Of course, such descriptions of a GUI are merely examples, and claimed subject matter is not so limited.

In a particular embodiment, a GUI may have a control panel for video playback, where the control panel may include controls for playing, stopping, pausing, fast forwarding, rewinding, skipping or doing the like with respect to video content, for example. A GUI may have a media bin panel that may include video content for playing in a video segment user interface, where the video content in the media bin panel may include still images, moving images, video clips, or video segments. A GUI may, of course, also include a properties panel to present properties for media selected from a media bin panel, in which the properties panel may have image controls, motion controls, opacity property controls, volume controls, or the like, for example. A GUI may also have the capability to present animation of scaling of a representation of timing signals associated with a selected video clip. A time scaler may therefore be employed to scale a representation of timing signals associated with a selected video clip if a video segment ceases playing in the video segment user interface.

One potential example of a process or a system having a capability to align electronic comments along a time line of video content may, for example, comprise a specific or special purpose apparatus executing the Premier Pro® product for editing video content, available from Adobe Systems, Inc. of San Jose, Calif. Of course, claimed subject matter is not limited in scope to employing this particular product or to the approach employed by this particular product. Rather this is merely provided as one example of an embodiment including this capability; however, many other approaches to providing this capability are available and claimed subject matter is not limited in scope to any particular approach.

Figure 2:
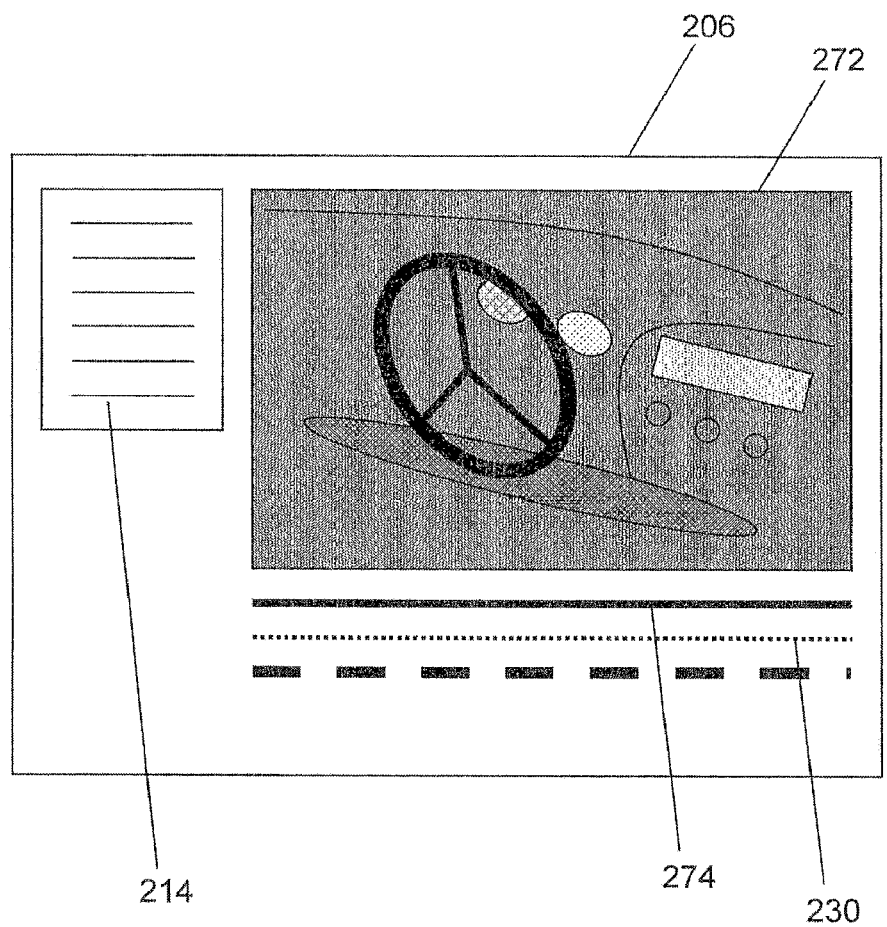

FIGS. 1 and 2 are screenshot views of an editor display and a reviewer display, respectively, according to a particular embodiment. Such displays may communicate with one another via an electronic network, an intranet, or the Internet, for example. An editor may select particular video clips using a worklist 112 displayed in editor display 103. Such a worklist may comprise a list of video clip file names, for example. Display 103 may also include a window 162 to display one or more frames of a video clip, a time line scale 164, comments 165 associated with a review of a video clip, or other editing or review features 167 useful for an editor. A reviewer display 206 may include a new work item, or task, displayed in a worklist 214, which may comprise one or more other tasks, for example. Other tasks on such a worklist may be associated with other video clips for review from other sources, including one or more editors or reviewers, though claimed subject matter is not so limited. Display 206 may also include a window 272 to display one or more frames of a video clip. Upon or after selecting a particular video clip to review, a reviewer may electronically post comments associated with the review, which may be displayed in a display field 230, for example. In a particular embodiment, a reviewer may also observe other, if any, reviewers' comments or review instructions electronically posted by an editor in such a display field. Such comments or instructions may be associated with a time line scale 274 in reviewer display 206 that may also be associated with the video clip. The time line associated with previous comments from other reviewers may be associated with new comments. After completion of a review, a reviewer may upload a reviewed video clip to a network, for example. In a particular embodiment, such an upload may be electronically implemented, for example, by a process management engine, as explained in further detail below, if a reviewer presents an indication that the review is complete. Such indication may include a reviewer closing a review window in reviewer display 206 or "clicking" on a display button to send a message to such a process management engine that the review task is complete. Of course, such screenshots are merely examples of user interfaces for a review process in a particular embodiment, and claimed subject matter is not so limited. Many other arrangements of a user interface are possible and claimed subject matter is not intended to be limited to any particular arrangement.

Figure 3:
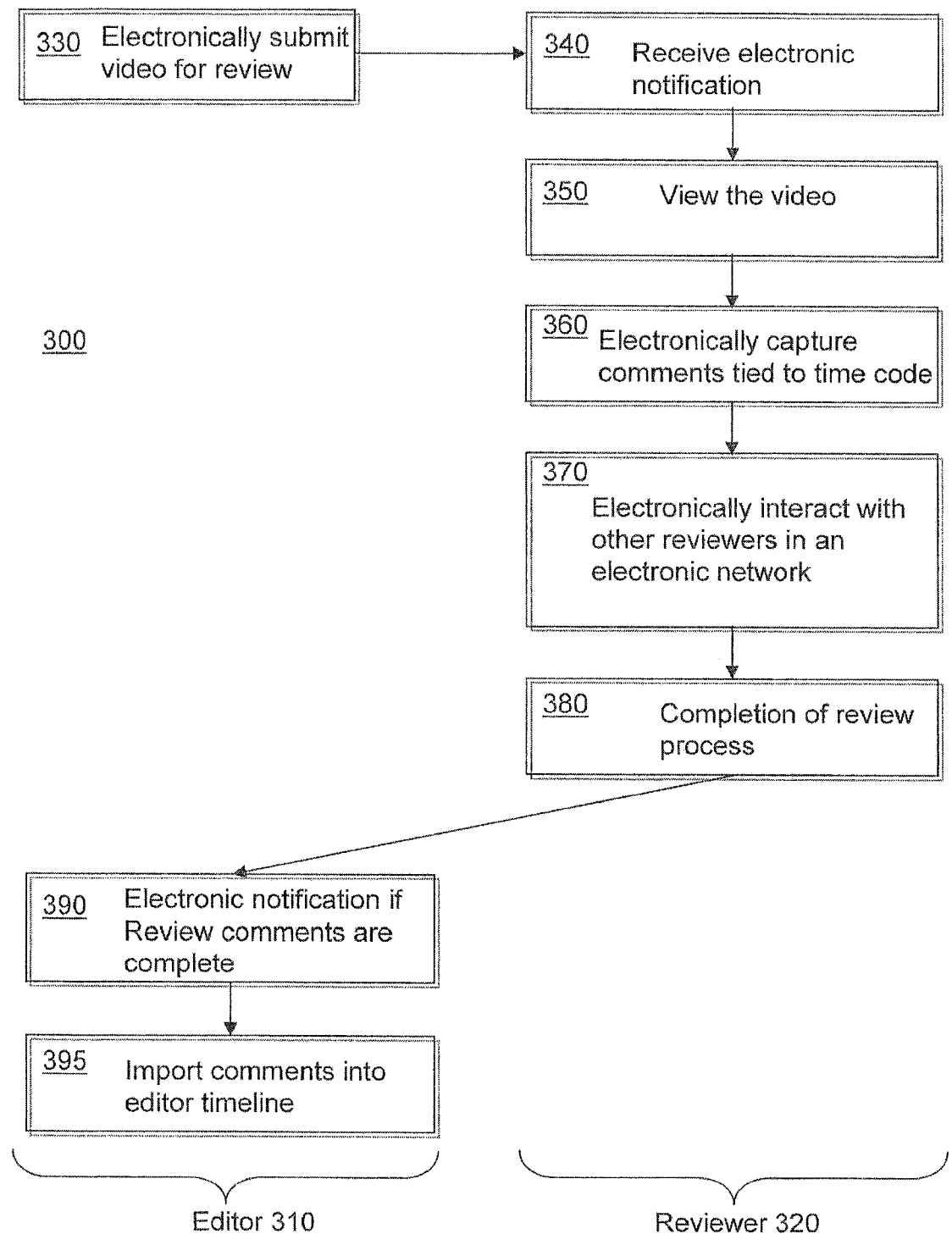
FIG. 3 is a flow diagram of a video review workflow process, according to an embodiment.

FIG. 3 is a flow diagram of a video review workflow process 300, according to an embodiment. Such a process may involve an editor 310 and a reviewer 320 for a video clip, for example. Such a video clip may comprise a portion of video content, such as a scene. As has been demonstrated already, teens such as "video clip", "video", "video content" or the like may be used interchangeably throughout this description. For example, a collection of one or more video files may comprise a video clip, although not necessarily. In a particular embodiment, process 300 may involve more than one reviewer or editor. However, alternatively, there may be several reviewers and one editor. Activities of an editor may include electronically submitting a video clip for review, as at block 330. Such an editor may review a video clip, observe one or more reviewers' comments, and resubmit a video clip for further review, just to name a few example activities. A reviewer's activities may include watching a video clip and generating comments, which may be captured electronically, regarding the video clip, as will be described below in more detail. At block 340, reviewer 320 may receive electronic notification that a particular video clip is available to review. Such electronic notification may comprise an appearance on a display of an icon or a dialog box, for example, of a new work item or task, or an electronic document including a worklist comprising one or more other tasks may appear, for example. Other tasks on such a worklist may be associated with other video clips for review from others, including one or more editors or reviewers. Reviewer 320 may then select a particular video clip to review, which may include viewing the particular video clip, as at block 350. A video clip for review may include associated electronically captured comments from a previous editor or one or more reviewers. Such comments may be time synchronized by associating the comments with a time code, or timeline that is also associated with the video clip. As part of a review, reviewer 320 may add his or her comments to the video clip also captured electronically, as at block 360. A time code associated with previous comments may also be associated with new comments, so that overall the comments are synchronized with one another. In other words, comments may be produced electronically and reviewed by an end user relative to a universal timeline. For example, reviewer 320, while watching a video clip, may stop the video clip at a video frame where the reviewer would like to add an electronic comment. This comment may then be associated with a time code of the video clip frame to be viewed later. In a particular embodiment, comments may be associated with other signal information relative to the video content other than a time code. As simply another example without limitation signal information representing location within a video clip frame may be employed. For example, a comment may be associated with coordinates of a video clip frame to highlight a particular portion of the video frame. Of course, such details of a time code or timeline are merely examples, and claimed subject matter is not so limited.

At block 370, reviewer 320 may interact with other reviewers, perhaps in real time, such as via an electronic network, intranet, or the Internet. For example, a second reviewer may receive a video for review over an electronic network from a first reviewer who has previously posted comments regarding the video. In one particular embodiment, the second reviewer may, upon receiving the video, review the video clip and post additional comments. Such additionally-posted comments may be available to the first reviewer in real-time, for example, depending at least in part on whether both reviewers are concurrently engaged in the video review process for the particular video clip. In such a case, a reviewer may view other reviewers' comments as the comments are being electronically posted or electronically captured for the other reviewers. Such a real time process is, of course, not limited to two reviewers since any number of reviewers may be engaged in a video review process. On the other hand, a reviewer may be disengaged or off-line from a real-time interaction as described above while other reviewer comments remain available to the disengaged reviewer at his or her convenience.

At block 380, after completion of a review, which may include electronically captured comments, reviewer 320 may electronically return the reviewed video clip to editor 310. In an embodiment, such a return of a video clip to an editor may comprise an electronic process upon or after completion of a review, as explained in more detail below. Separately reviewed video clips may be independently returned, all without specific human interaction, for example. At block 390, editor 310 may receive electronic notification that a review process for a particular video clip is complete. Such a notification may include appearance on an editor's display of a new work item, or task, in a worklist or in a dialog box or object comprising one or more other tasks, for example. Other tasks on such a worklist may be associated with other video clips that have been reviewed or are to be reviewed, for instance. Editor 310 may then select a particular video clip that has been reviewed to review a collection of comments from one or more reviewers of the particular video clip. As mentioned above, electronically captured comments may be associated with a time code that is also associated with the video clip. As at block 395, editor 310 may place comments into an external file or database, for example, which may include clipnotes, as explained below. For example, such clipnotes may be loaded into a video editor, such as the Premier Pro® editor, mentioned above, for possible further processing. In a particular embodiment, editor 310 may also add further electronic comments or edit the video clip, responsive to previous reviewer comments, for example. Subsequently, editor 310 may submit a new, revised version of the video clip as a new review, as at block 330, thus repeating a portion of the workflow process, if desired.

Figure 4:
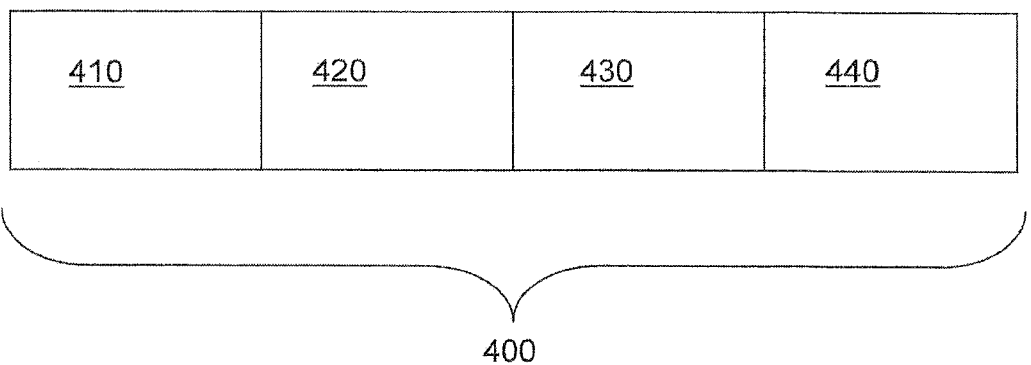
FIG. 4 is a schematic diagram of video content to be reviewed, according to an embodiment.

FIG. 4 is a schematic diagram of a portion of video content 400, according to an embodiment. Such video content may be communicated between one or more editors or one or more reviewers, for example. In a particular embodiment, video content 400 may include video content signals 410, electronic comments 420, or electronic signals 430 relating to attributes of the video content. Electronic comments 420 may include reviewer comments associated with a timeline, as described above, for example. Signals 430 may include electronic information and instructions regarding a review process for the particular video content. For example, an instruction directed to a particular reviewer may be provided. As in this example, signals 430 may indicate that video clip 410 is waiting to be reviewed by a particular reviewer. Likewise, signals 430 may be associated with a timeline, similar to electronic comments 420. Accordingly, video content 400 may comprise an electronic package to enable a coherent review process between editors or reviewers working with a universal timeline. Of course, such details of regarding video clips are merely examples, and claimed subject matter is not so limited.

Figure 5:
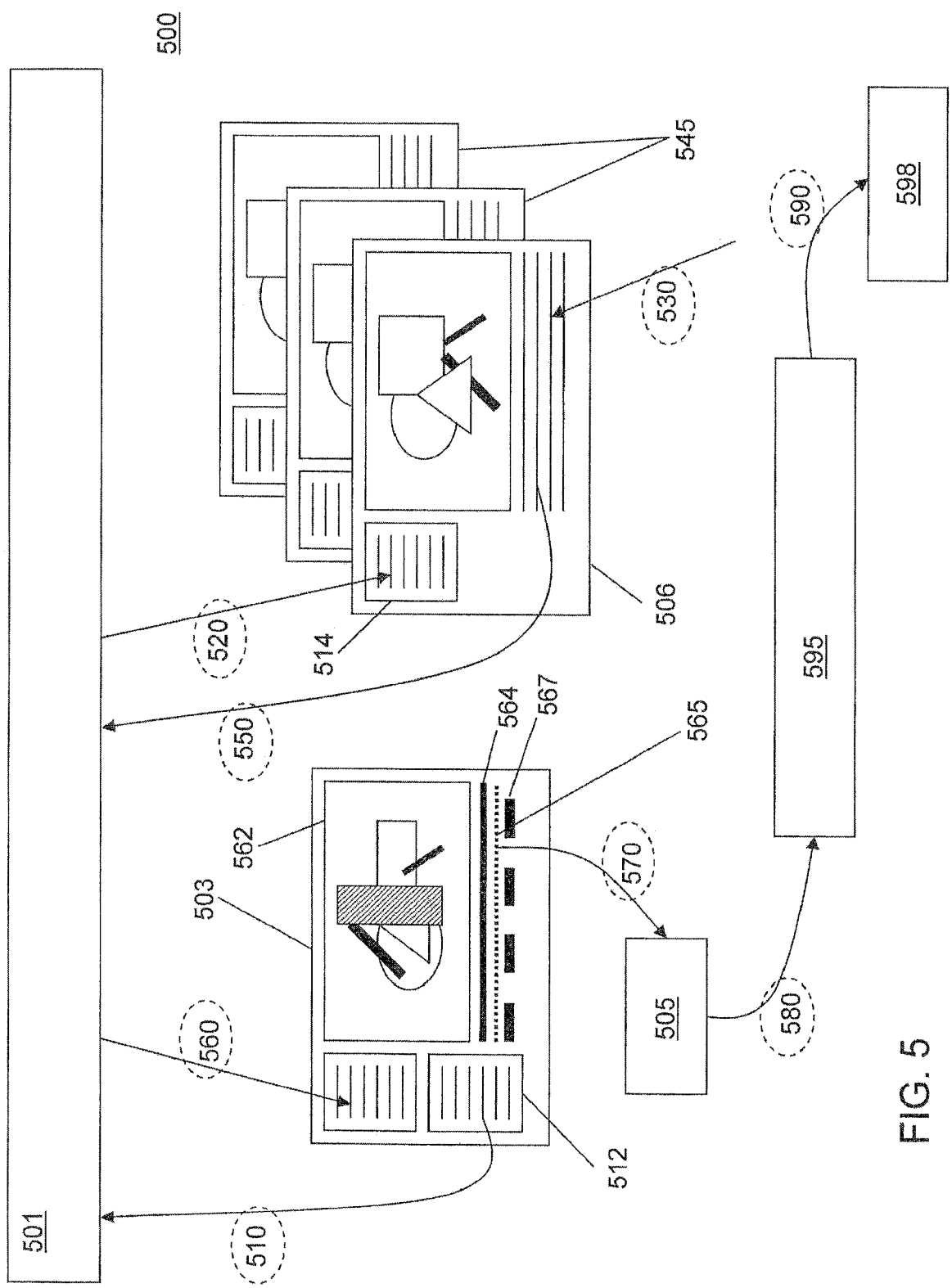
FIG. 5 is a schematic diagram illustrating a video workflow process, according to an embodiment.

FIG. 5 is a schematic diagram illustrating a video review workflow process 500, according to an embodiment. Such a process may operate based at least in part on a client-server network, which may use XML to share information among one or more editors and reviewers, for example. In one embodiment, a specific or special purpose computing platform may include a web browser or other application to communicate with a network, such as the Internet. In other words, exchanging or sharing applications, files, or electronic signals associated with video review workflow process 500 may be facilitated by XML, as explained below. Such applications, files, or electronic signals may be located separately or together on any portion of an electronic network or specific computing platform. In a particular embodiment, a management service, which may comprise a specific apparatus executing software that performs management service operations, for example, may be used to share or organize comments. Although claimed subject matter is not limited in scope in this respect, it is noted, that LiveCycle® Data Services software, for example, is available from Adobe Systems Incorporated. However, claimed subject matter is not limited in scope to employing this particular product or to the approach employed by such a product. For example, alternatively, XML may also be used to share comments, such as importing comments as XML-formatted notes into a video editor. Again, as a particular example, Adobe Premier Pro® software may import XML formatted 'clip notes'. However, again, claimed subject matter is not limited in scope to employing this particular product or to the approach employed by such a product. As will be explained in further detail below, a video format to share comments or notes may be selected and applied by a workflow engine. Such video formatting may be customized to correspond to systems or equipment used by particular reviewers or editors. For example, some reviewers may use tools that integrate relatively seamlessly or that are compatible with XML-formatted comments, while other reviewers may use tools that integrate relatively seamlessly or that are compatible with a management service, as described above. Of course, such a description of video formatting is merely an example, and claimed subject matter is not so limited. Video review process 500 may proceed independently of where such applications, files, data, or other information may be located in an overall system or network. For example, in a particular embodiment, a server may transmit video review signals, such as electronic video content 400, to or from a special purpose device for editor or reviewer client. In such a case, one may log onto a client-server system to begin participation in video review workflow process 500. In another particular embodiment, such as a desktop-based process, a special purpose or specific computing platform used by editors or reviewers, for example, may include a browser application to transmit signals to or receive signals from a particular site on the Internet that operates to oversee or manage video review workflow process 500.

Returning to FIG. 5, in this particular embodiment, a video review workflow process may include a number of features, some of which are now described. Referring to 510, an editor, such as editor 310 described above, may upload a video clip to a process management engine 501, which may reside on a server, for example. Such a process management engine may comprise a special purpose computing apparatus capable of executing instructions represented by digital signals, for example. In another particular embodiment, however, such an upload may be omitted, for example, such as where a master copy of a video may already be in a repository. For example, a process management engine may be capable of accessing such a master video repository directly or indirectly, such as via another device or set of interacting devices depending at least in part on the architecture of the particular embodiment. A process management engine may also be capable of displaying information from a master video repository so that an editor may select an appropriate video to review. A process management engine may additionally be used to add signal information to a master video repository, as defined by a client or supported by the particular repository system. As one simple example, review instructions may be added.

Craft editor 310 may select particular video clips using a worklist 512, which may be viewed by an end user via editor display 503. Such a display may also include a window 562 to visually provide or present a frame of a video clip, a timeline scale 564, comments 565 associated with a review of a video clip, or other editing or review features 567 useful for an editor. Process management engine 501 may provide process or workflow management including signal capture, digital rights management, content services, or content management, just to name a few examples. One potential example of a process or a system having the capability to provide such process or workflow management may, for example, comprise a specific or special purpose apparatus executing the LiveCycle® software for editing video content, available from Adobe Systems, Inc. of San Jose, Calif., mentioned above. Of course, claimed subject matter is not limited in scope to employing this particular product. Rather this is merely provided as one example of accomplishing this capability; however, many other approaches to providing this capability are available and claimed subject matter is not limited in scope to any particular approach.

Process management engine 501 may provide video clips to one or more reviewers, indicated by 520. A reviewer, such as reviewer 320 in FIG. 3, may then receive electronic notification that a particular video clip is available to review. Such a notification may, for example, in one embodiment, include an appearance on a reviewer display 506 of a new work item, or task, such as in a worklist 514 comprising one or more other tasks, for example. Other tasks on such a worklist may be associated with other video clips for review from other sources, including one or more editors or reviewers, though claimed subject matter is not so limited. Upon or after selecting a particular video clip to review, reviewer 320 may electronically post comments associated with the review, as indicated by 530. Reviewer 320 may also observe other, if any, reviewers' comments or review instructions electronically posted by editor 310. As mentioned above, such comments or instructions may be associated with a time code that may also be associated with a video clip. A time code associated with previous comments from other reviewers may be associated with new comments. Likewise, reviewer 320 may interact with other reviewers, perhaps in real time, via an electronic network, as depicted by displays 545 in FIG. 5. For example, a second reviewer may receive a video for review from process management engine 501 at substantially the same time or concurrently with a first reviewer. The second reviewer may review the video clip immediately or wait. Depending at least in part on whether both reviewers are logged in or "online" with respect to a video review workflow process for the particular video clip, a first reviewer may receive a second reviewer's comments in real time. In process 550, after completion of a review, reviewer 320 may upload the reviewed video clip to process management engine 501. In a particular embodiment, such an upload may be electronically implemented by process management engine 501 if a reviewer presents an indication that the review is complete. Such indication may include a reviewer closing a review window in reviewer display 506 or "clicking" on a display button to send a message to process management engine 501 that the review task is complete, to provide possible examples. In another particular embodiment, a reviewer need not know where a reviewed video clip or related comments are to be subsequently transmitted, since electronic communications among reviewers or editors may be handled by process management engine 501, though claimed subject matter is not so limited to such a feature. Individual reviewers may likewise perform such an upload of a reviewed video clip independently of one another. In process 560, process management engine 501 may electronically provide video content to an editor, who may then receive electronic notification that a particular video clip has been reviewed or that associated review comments are available. Again, in a particular embodiment, such a notification may include appearance on editor display 503 of a work item, or task, in a worklist 512 comprising one or more other tasks, for example. In a particular embodiment, editor 310 may add further comments, instructions, or edit the video clip, which may be responsive to previous reviewer comments, for example. In still another particular embodiment, some reviewers may not have the capability to view other particular reviewers' comments, or such reviewers may have the capability to view a portion, rather than all comments by other reviewers' comments; for example, specific sorts of comments may be made available or particular reviewers comments may be made available. For example, a process management engine may be configurable to implement particular information sharing rules, according to client preferences, for example. As mentioned above, such comments, information, or instructions may be associated with a time code that may also be associated with a video clip. Again, a time code associated with previous comments from other reviewers may be associated with new comments. Subsequently, in one implementation, editor 310 may submit a video clip after adding editor comments as a new review. In another implementation, editor 310 may electronically export comments, including available electronic comments from all reviewers and the editor, into a database or clipnotes file 505, indicated by 570, for example. Such a file may then be electronically imported into video editor 595, indicated by 580, which may comprise a video content editing system such as a Premier Pro® system, for example. Such a video editor may, for example, organize comments into a time-based format so that a collection of electronic comments may be viewed with respect to a timeline, as described above. In a particular embodiment, individual comments may be displayed on portions of a timeline associated with video frames to which the comments apply. Using such a video editor, editor 310 may edit a video clip, as indicated by 590, to render a "finished" video 598. Of course, such a process management engine is merely an example, and claimed subject matter is not so limited.

Figure 6:
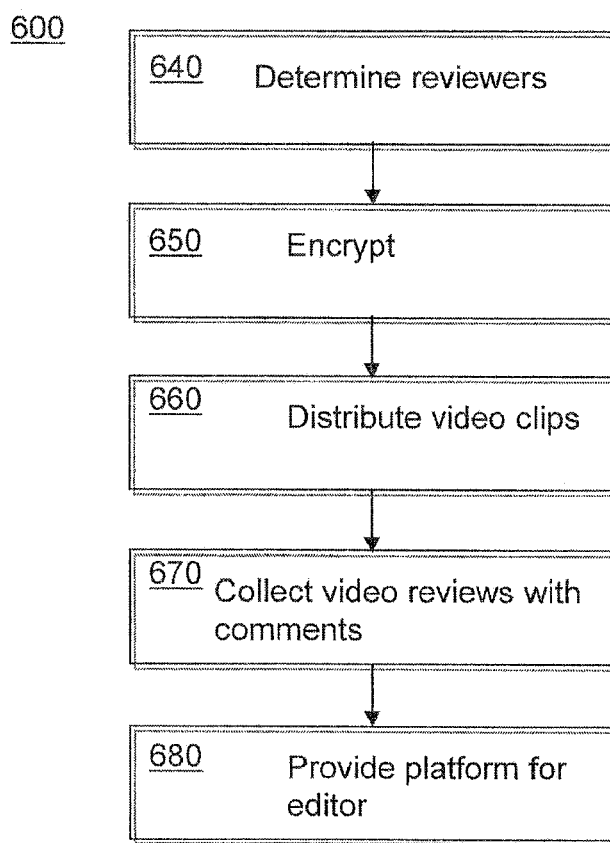
FIG. 6 is a flow diagram of a video workflow process, according to an embodiment.

FIG. 6 is a flow diagram of a possible workflow 600, according to an embodiment. Such a workflow embodiment may comprise a video review workflow process as described above, although claimed subject matter is not limited in scope in this respect. Workflow 600 may comprise a portion of a complete or full workflow. Starting at block 640, a process management engine, such as process management engine 501 in FIG. 5, may generate a list of reviewers for a particular video clip. Such a determination may, for example, be based at least in part on past review processes, requests posted by an editor, or availability of reviewers, just to name a few examples. Also, process management engine 501 may determine an order of reviewers on the list, as well as an order of other tasks that are to be implemented. At block 650, video clips or associated comments to be distributed to reviewers may be encrypted for security reasons. Whether a particular video clip or associated comments are encrypted may depend at least in part on a variety of potential factors, such as which reviewer is to be sent a particular video clip, as one example. Such encryption may be implemented during workflow 600, for example, according to a selection made by an editor or a reviewer. Process management engine 501 may determine if a video clip, its associated comments, or both are to be encrypted, for example. In one implementation, such encryption may be applied to any combination of a video clip and associated review comments. Such encryption may also include digital rights management (DRM) information or user-permission information, such as access passwords, user identification, or the like. In another implementation, a combination of a video clip and associated review comments may be digitally compressed to reduce communication bandwidth issues. At block 660, video clips may then be electronically distributed or broadcasted to reviewers or editors for completion of review tasks regarding the video clip. Workflow 600 may also include transforming a format of one or more video clips, for example. Such a transformation may be implemented, for example, during a workflow process. In a particular embodiment, a video format may be transformed for compliance or compatibility with systems of particular editors or reviewers. As an example, a reviewer may be using a handheld device having a low-resolution video format, whereas another reviewer may use a workstation having a high-resolution video format. Accordingly, a process management engine may be able to determine and implement appropriate video formats for the particular devices employed by particular editors or reviewers. In a particular example, after a full resolution video clip is uploaded or "dropped" in a system folder, a process management engine may broadcast information based, at least in part, on the full resolution video clip via multiple distribution channels. Such information may be generated by an encoding process that generates multiple video clip versions having a specific resolution and bit rate targeted for an array of delivery channels corresponding to a particular set of editors or reviewers and their device or other resource capabilities. For instance, one channel may be employed to provide high definition playback on a local area network, another channel may be employed to provide high definition playback on a high speed network, and another channel may be employed to provide a scaled-down version for cable, Digital Subscriber Line (DSL) connections or for mobile devices. In another particular example, such generated information may be stored in multiple files, which may be accessible by a streaming media server. Accordingly, if an editor or reviewer "logs" into a process management engine, a video clip may be streamed from a media server with an appropriate version of the video clip based at least in part on the particular video format or available bandwidth. In a particular embodiment, a process management engine may be capable of dynamically changing stream quality "on the fly" if network conditions change, such as a reduced bandwidth condition developing from increased high speed network traffic.

At block 670, process management engine 501 may electronically receive or organize reviews of video clips as or soon after they are completed. Such reviews may comprise reviewer comments or instructions for particular video clips, for example. At block 680, process management engine 501 may provide a special purpose platform for an editor, such as editor 310, to review comments posted by reviewers, and to respond to such comments by the reviewers. Of course, such details of a workflow process are merely examples, and claimed subject matter is not so limited.

Figure 7:
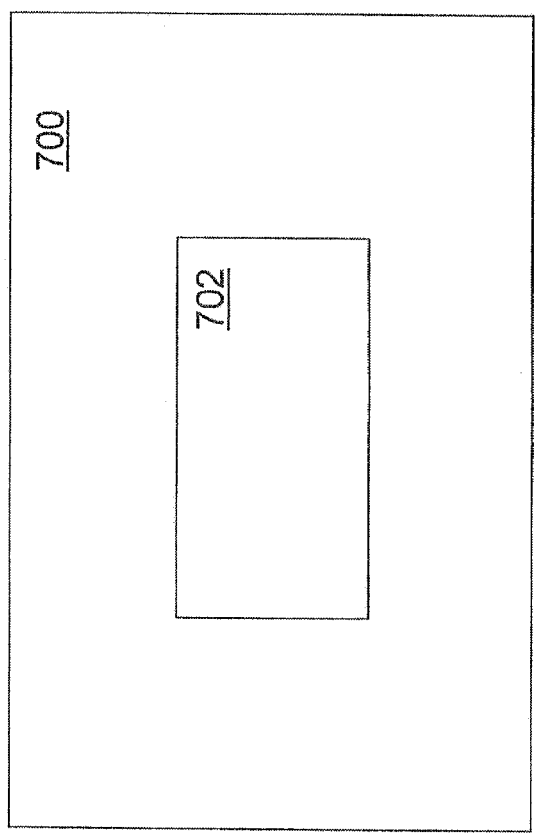
FIG. 7 is a schematic diagram illustrating an embodiment of a storage medium having instructions stored thereon that if executed result in performance of an embodiment of a video review workflow process.

FIG. 7 is a schematic diagram of an article 700 having stored thereon instructions 702 that may, if executed, such as by one or more specific apparatuses, such as a specific or special purpose computing system, result in an embodiment such as one or more of the embodiments described above. For example, instructions 702, which may be stored in storage media such as flash memory, CD-ROMs or disks for example, may, if executed, result in an embodiment of a method of video reviewing. Though again it should be noted that this is merely an illustrative example and that claimed subject matter is not limited in this regard.

It will, of course, also be understood that, although particular embodiments have just been described, claimed subject matter is not limited in scope to a particular embodiment or implementation. For example, one embodiment may be in hardware, such as implemented on a device or combination of devices, as previously described, for example. Likewise, although the claimed subject matter is not limited in scope in this respect, one embodiment may comprise one or more articles, such as a storage medium or storage media, as described above for example, that may have stored thereon instructions that if executed by a specific or special purpose system or apparatus, for example, may result in an embodiment of a method in accordance with claimed subject matter being executed, such as one of the embodiments previously described, for example. As one potential example, a specific or special purpose computing platform may include one or more processing units or processors, one or more input/output devices, such as a display, a keyboard or a mouse, or one or more memories, such as static random access memory, dynamic random access memory, flash memory, or a hard drive, although, again, the claimed subject matter is not limited in scope to this example.

In the preceding description, various aspects of the claimed subject matter have been described. For purposes of explanation, specific numbers, systems, or configurations may have been set forth to provide a thorough understanding of claimed subject matter. However, it should be apparent to one skilled in the art having the benefit of this disclosure that claimed subject matter may be practiced without those specific details. In other instances, features that would be understood by one of ordinary skill were omitted or simplified so as not to obscure claimed subject matter. While certain features have been illustrated or described herein, many modifications, substitutions, changes or equivalents may now occur to those skilled in the art. It is, therefore, to be understood that the appended claims are intended to cover all such modifications or changes as fall within the true spirit of claimed subject matter.

What is claimed is:

1. A non-transitory computer readable medium having instructions stored thereon that, when executed by one or more processors, cause the processors to:

transmit, from a browser application executing on a client computer, to a process management server, information for customizing a workflow schedule, wherein the workflow schedule (a) defines a plurality of tasks, (b) identifies one or more reviewers assigned to complete the tasks, (c) identifies a video clip with respect to which the tasks are to be performed, and (d) specifies an order in which the tasks are to be performed;

receive, at the browser application, from the process management server, the video clip and first comments resulting from completion of the tasks, wherein the first comments received at the browser application have been synchronized with the video clip;

receive user input at the browser application that defines second comments associated with the video clip;

generate, at the client computer, an XML-formatted clipnotes file that represents the first and second comments;

open the XML-formatted clipnotes file and the video clip in a video editor executing on the client computer, wherein the video editor and the browser application are separate applications executing on the client computer; and modify the video clip with functionality provided by the video editor to generate a finished video.

2. The non-transitory computer readable medium of claim 1, wherein the instructions, when executed by the one or more processors, further cause the processors to:

display at least a portion of the video clip in a video player window provided by the video editor;

display a timeline adjacent to the video player window in the video editor, wherein a particular position along the timeline corresponds to a particular time which, in turn, corresponds to a particular video frame which is displayed in the video player window at the particular time; and display a representation of a specific comment selected from the first and second comments at a specific position along the timeline, wherein the specific position at which the representation is displayed corresponds to a specific time associated with the specific comment.

3. The non-transitory computer readable medium of claim 1, wherein the workflow schedule identifies a plurality of video clips with respect to which the tasks are to be performed.

4. The non-transitory computer readable medium of claim 1, wherein the instructions, when executed by the one or more processors, further cause the processors to transmit the video clip from the browser application to the process management server.

5. The non-transitory computer readable medium of claim 1, wherein receiving the first and second comments includes receiving, for at least one specific comment selected from the first and second comments, a timestamp that identifies a time, within the video clip, that the specific comment was generated.

6. The non-transitory computer readable medium of claim 1, wherein the workflow schedule further specifies a first one of the reviewers who is not allowed to see comments generated by a second one of the reviewers.

7. The non-transitory computer readable medium of claim 1, wherein the instructions, when executed by the one or more processors, further cause the processors to:

maintain the first and second comments in a database; and
associate at least one particular comment selected from the first and second comments with a time code that corresponds to a time, within the video clip, at which one of the reviewers generated the particular comment.

8. The non-transitory computer readable medium of claim 1, wherein the instructions, when executed by the one or more processors, further cause the processors to display at least a portion of the video clip in a video player window provided by the video editor.

9. The non-transitory computer readable medium of claim 1, wherein at least one of the reviewers is a user who is authorized to modify the video clip.

10. A method comprising:
transmitting, from a browser application executing on a client computer, to a process management server, information for customizing a workflow schedule, wherein the workflow schedule (a) defines a plurality of tasks, (b) identifies one or more reviewers assigned to complete the tasks, (c) identifies a video clip with respect to which the tasks are to be performed, and (d) specifies an order in which the tasks are to be performed;
receiving, at the browser application, from the process management server, the video clip and first comments generated as a result of completing the tasks, wherein the first comments are synchronized with the video clip;
receiving user input at the browser application that defines second comments associated with the video clip;
generating, at the client computer, an XML-formatted clipnotes file that represents the first and second comments;
opening the XML-formatted clipnotes file and the video clip in a video editor executing on the client computer, wherein the video editor and the browser application are separate applications executing on the client computer; and
modifying the video clip with functionality provided by the video editor to generate a finished video.

11. The method of claim 10, further comprising displaying representations of at least two comments selected from the first and second comments on a timeline generated by the video editor.

12. The method of claim 10, further comprising displaying a representation of a particular one of the first and second comments on a timeline generated by the video editor.

13. The method of claim 10, further comprising transmitting the video clip from the browser application to the process management server after receiving the second comments associated with the video clip.

14. The method of claim 10, further comprising displaying at least a portion of the video clip in a video player window provided by the video editor.

15. The method of claim 10, further comprising transmitting the video clip from the browser application to the process management server after receiving the second comments associated with the video clip, wherein the video clip is transmitted with the received second comments.

* * * * *